(12) United States Patent
Gupta

(10) Patent No.: US 6,449,673 B1
(45) Date of Patent: Sep. 10, 2002

(54) SNAPSHOT AND RECALL BASED MECHANISM TO HANDLE READ AFTER READ CONFLICT

(75) Inventor: C. Nagesh Gupta, San Jose, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/313,461

(22) Filed: May 17, 1999

(51) Int. Cl.[7] .......................... G06F 13/14; G06F 12/00
(52) U.S. Cl. ........................ 710/240; 711/147
(58) Field of Search ................. 710/240–244, 710/39, 112; 711/147–153; 712/216–219

(56) References Cited

U.S. PATENT DOCUMENTS

| | | | |
|---|---|---|---|
| 5,201,057 A | * 4/1993 | Uht | 712/207 |
| 5,548,795 A | * 8/1996 | Au | 710/52 |
| 5,710,902 A | * 1/1998 | Sheaffer et al. | 712/216 |
| 5,898,853 A | * 4/1999 | Panwar et al. | 712/216 |
| 5,903,749 A | * 5/1999 | Kenner et al. | 712/226 |
| 6,023,745 A | * 2/2000 | Lu | 711/5 |
| 6,065,105 A | * 5/2000 | Zaidi et al. | 712/23 |

OTHER PUBLICATIONS

Archibald et al., "Cache Coherence Protocols: Evaluation Using a Microprocessor Simulation Model", ACM Transactions on Computer Systems, vol. 4, No. 4, Nov. 1986, pp. 273–298.*
Papamarcos et al., "A Low–Overhead Coherence Solution for Multiprocesors with Private Cache Memories", IEEE 0194–7111/84/0348, 1984, pp. 348–354.*
Goodman, James R., "Using Cache Memory to Reduce Processor Memory Traffic", ACM 0149–7111/83/0600/0124, 1983, pp. 124–131.*

* cited by examiner

Primary Examiner—Sumati Lefkowitz

(57) ABSTRACT

The inventive memory controller reduces bandwidth usage by employing a snapshot matrix or algorithm which, when a read after read conflict occurs, will create a snapshot of requests for a given address in order to efficiently process data returns. The conflicting hardware resources required to implement such a structure is very simple and efficient, thus enabling high frequency operation.

26 Claims, 3 Drawing Sheets

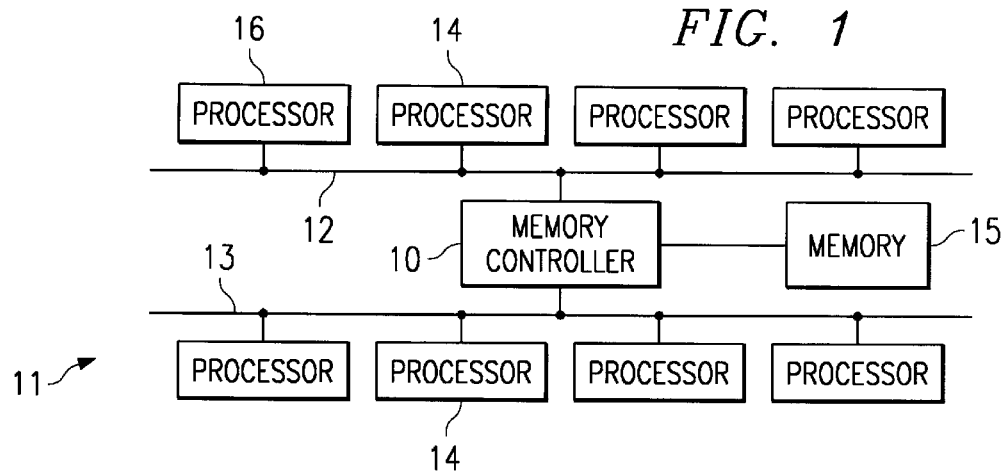
FIG. 1
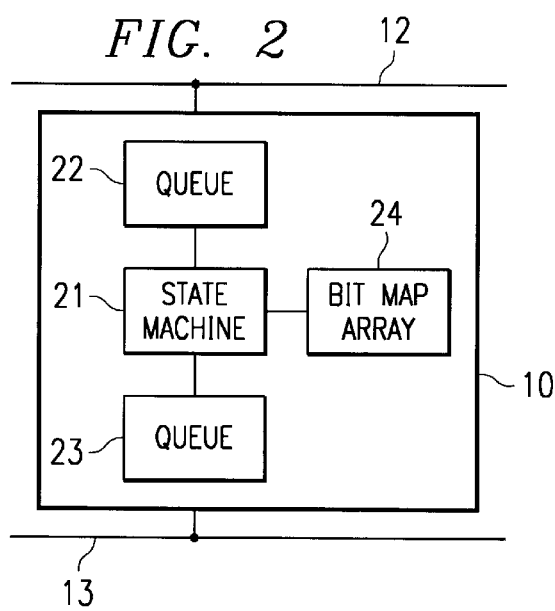
FIG. 2
FIG. 4
INCOMING TRANSACTIONS 41
PRIOR PENDING TRANSACTIONS THAT CONFLICT WITH INCOMING TRANSACTIONS 42

SNAPSHOT AND RECALL BASED MECHANISM TO HANDLE READ AFTER READ CONFLICT

RELATED APPLICATIONS

This application is related to co-pending commonly owned application entitled DECREASING MEMORY RETURN LATENCY BY PREDICTING THE ORDER OF COMPLETION OF PARTIALLY READY RETURNS, Application Ser. No. 09/282,115, filed on Mar. 31, 1999, incorporated herein by reference.

TECHNICAL FIELD OF THE INVENTION

This application relates in general to a memory controller for a multiprocessor computer system, and in specific to a mechanism for maximizing available bandwidth on the address bus by utilizing and "snapshot" matrix to reduce "retries" of conflicting memory data requests.

BACKGROUND OF THE INVENTION

The different processors of the multiprocessor network typically share access with a common memory, such as a shared RAM memory, that pulls a cache line of data and sends it to a processor, which then puts the line into its cache. Requests for access to the shared memory from the given processors are routed through a memory controller. This prevents concurrent accesses to the same data, and as such, a requesting processor will receive current data and not stale data from memory. The memory controller receives a read request from one of the processors. The memory controller then reads the data from the memory. The memory controller then formats a response to the request that includes the data, and then sends the response back to the requesting processor.

In doing so, the memory controller has to make sure that it has not violated coherency issues which might occur incases where, in a first instance, there is a read to a cache line and later there is another read to the same cache line from a different processor before the data for the first read was returned by the memory controller. In such situations, the memory controller has to make sure that in processing the second read it does not violate coherency by sending the old data which it has in the memory to the second read. The data that the controller returns for the first read could be modified by the processor which got the first read response. Instead, with respect to the second read, the memory controller needs to make sure that the data for the second read is from the processor that originated the first read. This problem has been solved by performing a retry operation. Accordingly, the memory controller will issue a "retry signal," which essentially tells the microprocessor which is sending the second read request to retry the read request at a later time. Consequently, the effect of the memory controller not being ready to return the response for the data and the subsequent retry operations, is that more of the system bus bandwidth is used. Thus, the prior art retry operations does lower the system performance, because the operations will generate unnecessary transactions on the system bus.

Furthermore, prior art memory controllers are designed to process requests in order, thus the memory controllers would return a response with the requested data in the same order that the requests for data are received. Some memory controllers also issue read requests to memory in the same order as the corresponding requests are received by the memory controller. Hence, the returns from the memory are also in the same order, causing the request transactions to be always completed in the order in which they were received. The next transaction that will be available to be returned to a processor is clearly known, since the memory controller operates according to the received order of the requests. Consequently, the memory controller can perform preparation operations in anticipation of returning the data from memory. However, the order requirements of the prior art controllers have several limitations. Servicing the requests in order requires a large amount of queue space. Data received by the memory controller from the memory must be held until the request associated with the data is sequentially the current request. Thus, the data from memory must be queued. This also causes a back log of requests, as requests cannot be satisfied until their associated data is returned. As a further consequence, the prior art controllers experience long latencies, because of the queuing of the requests and the data. Also, since the requests must be processed in a particular order, the requests cannot be re-ordered by the controller to maximize bus utilization and throughput. Thus, if address 1 is followed by address 2 and then address 3, the data supplied must be in phase accordingly (i.e. data 1, data 2, data 3, etc.) As such, the hardware of the system is inefficiently used.

Therefore, there is a need in the art for a memory controller that more efficiently uses queue spaces by permitting out of order returns and avoids the bandwidth intensive "retry" scheme so as to optimize use of the memory bus. The hardware design should be simple and efficient, so that high frequency operation is possible. The design should be simple to understand, so that it is easy to verify.

SUMMARY OF THE INVENTION

These and other objects, features and technical advantages are achieved by a system and method that permits the aforementioned inefficiencies to be ameliorated by maximizing the available bandwidth through a mechanism which uses a "snapshot" matrix.

The invention is a memory controller that is connected between at least one bus and a memory, with the bus connected to at least two processors. Note the inventive memory controller can operate with a single processor, however, the advantages of the invention are realized when the bus has at least two processors. The inventive memory controller manages read requests from the processors. The memory controller fetches the data from memory and checks to see if another processor has ownership of the requested data. If so, the owning processor will respond to the requesting processor. The invention, after receiving a read request, examines on-chip resources to determine whether prior requests are pending that involve the same memory resources as the received read request, e.g a cache line of memory in RAM. The invention uses a snapshot matrix to track received transactions conflicting with the prior pending transactions. Each received transaction is assigned a unique identification, based on a maximum number of transactions the invention can manage at a certain time. The prior pending transactions are reviewed in order to determine whether any conflicts exist with the received transaction. In the event of a conflict, the received transaction is entered into a snapshot matrix. All prior conflicting transactions must be processed before data is returned for the received transaction. Note that multiple read requests may be processed out of order to maximize the memory bus utilization and throughput. Note that the completed transaction may be returned in an order that is different from the read request order. Since transactions are processed out of order, data return latency is reduced. The snapshot matrix imposes strict ordering between conflicting transactions.

Therefore, it is a technical advantage of the present invention to have a memory controller provides coherency between data requests and data returns for read request transactions, and thereby improve system performance.

It is another technical advantage of the present invention that requests can originate from multiple processors located on multiple buses.

It is a further technical advantage of the present invention that the memory controller may be implemented in hardware such that the invention can operate at high frequencies and the logic can be easily verified.

It is a still further technical advantage of the present invention that the memory controller can maximize available bandwidth on the address bus.

It is a still further technical advantage of the present invention to use a bitmap to record pending transactions such that after a pending transaction has been completed, a clear signal will be generated to clear all future transactions that are waiting for the now completed transaction to finish.

The present invention avoids retrying requests that are conflicting with already pending requests. Pending requests are requests for which the memory data has not yet been returned. If a conflicting request is retried, the request will be reissued by the processor. This wastes precious system bus address bandwidth.

Every transaction is assigned a unique identifier as soon as it is received. When a conflicting request is discovered, it is entered into a "snapshot" matrix. Ideally, the snapshot natrix contains only the transaction identifiers which are conflicting with the received request. But, for simplicity, all the previous transactions could be copied into the snapshot matrix. The idea is that a conflicting transaction should be completed only after all the previous transactions conflicting with the new transaction are completed.

When all the previously conflicting transactions are completed, the memory controller will issue a request on the system bus to recall the data for the transaction that was initially inserted into the snapshot matrix. If any processor has the data associated with this transaction, the data will be supplied by the processor. This data will be returned as response for transaction that was entered into the snapshot. If none of the processors had modified the data, the data from the memory will be returned as the response.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 1 depicts a block diagram of the inventive memory controller within a system;

FIG. 2 depicts a block diagram of the internal structure of the inventive memory controller of FIG. 1 including the bit map array;

FIG. 4 depicts an embodiment of the bit map array of FIG. 2 holding examples of the inventive snapshot matrix.

DESCRIPTION OF THE INVENTION

Figure 3:
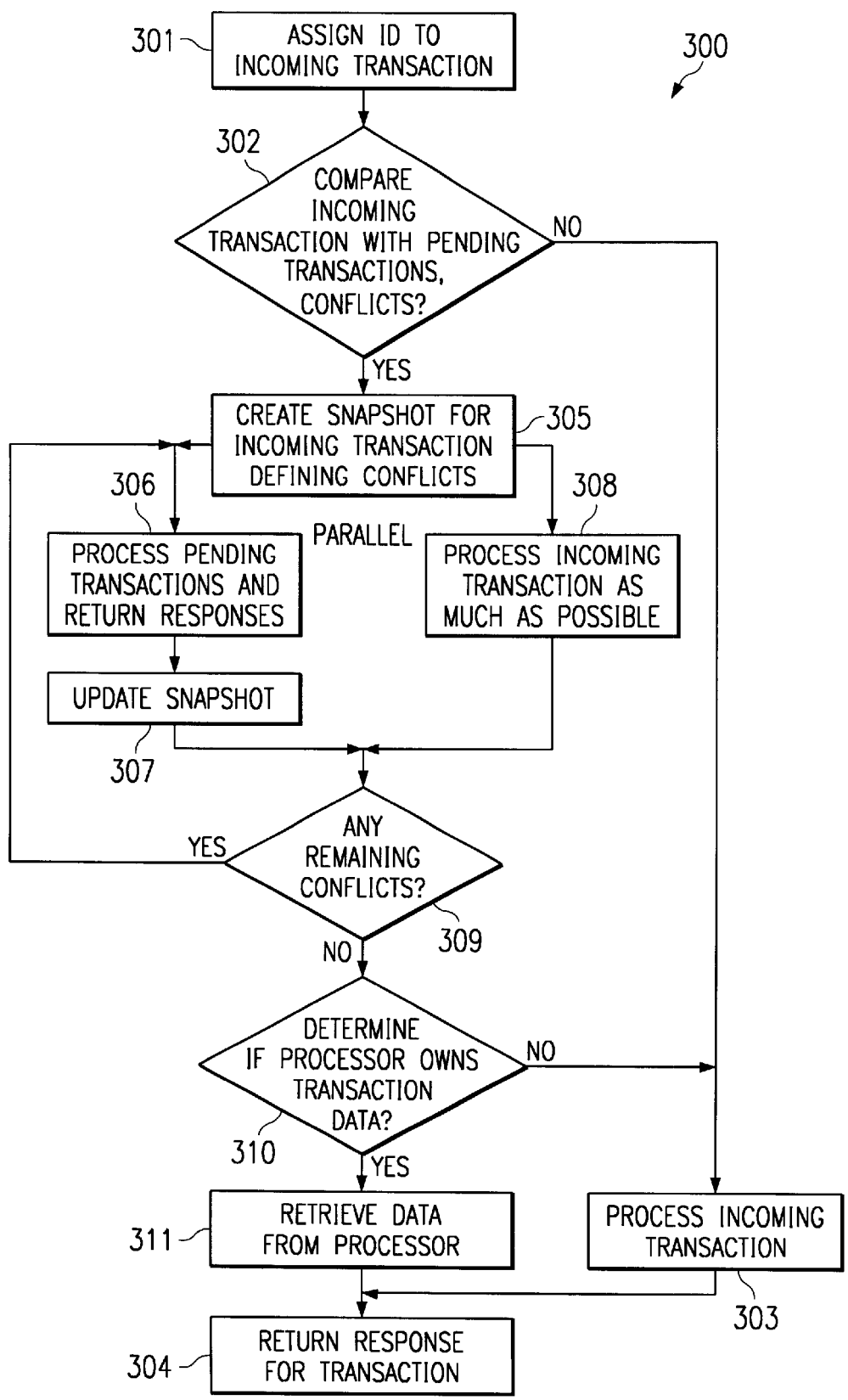
FIG. 3 depicts a flowchart of the operations of the inventive snapshot matrix of if the memory controller of FIG. 1.

FIG. 1 depicts the inventive memory controller 10 in system 11. The memory controller is connected to two buses 12, 13. Each bus is connected to and is capable of supporting multiple processors 14. Note that the system may have more or less processors connected to each bus. Also, the system 11 may have only one bus or more than two buses. The memory controller 10 manages read requests from the processors 14. The memory controller 10 receives a read request from one of the processors. The memory controller 10 then reads (or writes) the data from (or to) the location specified in the read (or write) request. If such data is at the specified location, the data is sent to memory controller 10, which returns the data to the requesting processor, via a read response. The memory controller also checks to see if another processor has ownership of the requested data. If so, the memory controller will allow the owning processor to respond to the requesting processor. Note that the memory controller 10 also performs other tasks not described herein, such as pre-charging the RAM memory, or writing back data into the memory. Further note that the invention is described in terms of read requests, however the invention can also work with other types of memory operations such as forwarded I/O read data.

The buses 12, 13 support multiple transactions, including multiple read requests. The memory controller 10 includes a storage queue for maintaining information about the pending requests until associated responses have been sent out. The system buses supports split transactions. Thus, the data return for a transaction need not follow the request, but can come in later, after data returns for subsequent transactions. In other words, the data returns need not be in the same order as the data requests. Accordingly, multiple pending read requests may be processed out of order to maximize the memory bus utilization and throughput. For example, if request A is received from processor 1 and request B is received from processor 2 in that order, then the data for request B may be returned to processor 2 before the data for request A is returned to processor 1. Out of order data return is an important feature, as the memory controller will not hold the bus until the data return is complete. As such, the bus is free for other transactions.

However, a given bus protocol specification may impose order on some of the different phases of the read request transaction. By way of example, the buses may be based on MESI (an ordered protocol which stands for Modified, Exclusive, Shared, Invalid). Certain phases of the transaction will happen in the same particular order as the data memory requests are seen on the buses, these phases are known as the in-order phases. Data may be returned to the requesting processor after these phases are complete. The in-order phases of the transaction are the request phase, the snoop phase, and response phase. Note that other phases may exist before or after these phases, but are not necessarily described herein. Furthermore, it is important to recognize that the multiple in-order phases can be pending for different transactions and that the in-order phases means that the oldest particular in-order phase will be completed first (i.e. the oldest request phase should complete the response phase first.)

FIG. 2 depicts the internal arrangement of the memory controller 10. State machine 21 tracks the progression of the various transactions through the different phases and updates the information in the queues 22, 23. The inventive memory controller 10 includes a bit map array 24 which is used to store the transaction snapshots. The memory controller 10 uses queue 22 to store information about the transactions as they are going through their various phases. The information includes information about the read request identifier, the memory request, memory address information, the local remote snoop inquiries, and phase completion information. Note that if the system 11 has more than one bus 12, 13, then the local snoop phase is where only the bus of the requesting processor is checked. All other buses would be considered remote buses, e.g. bus 13. The memory controller 10 also initiates a remote snoop phase for each remote bus 13, by placing a snoop inquiry on each remote bus. Note that the information stored in the queue is bus specific, and thus each bus 12, 13, of a multi-bus system would have a separate queue 22, 23. Further note that the inventive aspects of the memory controller are implemented in hardware. Memory controller 10 uses state machine 21 to keep track of the implementation of the snapshot 301, as further described in FIG. 4. The state machine 21 is also used to update the queues to reflect the status of the different pending transactions as they progress toward completion.

FIG. 3 depicts a flowchart 300 of the operations of the inventive memory controller 10. The memory controller assigns a unique identifier to each incoming transaction as the transactions are received. Every new transaction receives a unique identifier, and as such, the number of unique identifiers corresponds to the number of pending transactions that the memory controller can support. The state machine 21 then compares 302 requested memory locations in the incoming transactions with those of the pending transactions in the queues 22, 23 to determine whether there are any conflicts. If there are no conflicts, then the memory controller can then process 303 the transaction, including fetching the data stored in memory at the specified location, and then form and return 304 a response packet to the requesting processor, which includes the fetched data. If the memory controller finds that the address received conflicts with any of the pending transactions in the queue, it creates 305, via the state machine 21, a list of all the pending transactions in the queue that conflict with the incoming transaction, which is defined as the "snapshot" (i.e. of the conflicting transactions.) A conflict occurs when two transactions are attempting to read or access from the same portion of memory or the same cache line. A cache line is a fixed number of bytes, e.g. 64 bytes of memory. Note that a conflict occurs if the portions overlap and fall in the same cache line. For example, a conflict would arise if transaction A desires to read addresses 0–10, and transaction B desires to read addresses 5–15. A conflict would also arise if the memory portions exactly match, e.g. 0–10 and 0–10. The incoming transaction would be completed only after the snapshot of the conflicting transactions are completed. The memory controller then processes 306 other transactions, including those on the snapshot. As older transactions are completed, corresponding entries are removed from the snapshot 307. During the processing of the pending transactions, the memory controller may also begin processing of the incoming transaction 308. However, the transaction may only be processed up to the point of the conflict, i.e., prior to accessing the data. When this point is reached, further processing is halted until all of the conflicts listed in the snapshot have been cleared 309. If conflicts remain, the other pending transactions continue to be processed until all conflicting transactions have been removed from the snapshot. When all conflicts have been cleared the memory controller determines if the processor has ownership of the data requested by the transaction 310. To make this determination 310 the memory controller will issue a request on the bus for the processors to return the data. If all processors return coherency responses, indicating non-ownership of the data, then the data in memory will be used 303. If the processor owns the data, then the data returned from the processor 311 will be used for the response. Note that when the processor has finished with owning the data, the processor returns an acknowledgment to the memory controller that includes either a release of control of the data, or new (or amended) data which will overwrite the old data. Then a response is sent to the originating processor 304.

A bit map array, as shown in FIG. 4, is used efficiently to track the pending transactions associated with the conflicting transactions. The bit map is essentially a n×n matrix, where n is the maximum number of unique identifiers that the memory controller can support. Note that the bitmap can be either considered as an m×m matrix, if m is the total number of unique transactions that the memory controller can handle, or as an xn×xn map. If the bitmap is considered as an xn×xn matrix, x indicates the number of buses and n indicates that number of unique identifiers per bus. In the bitmap, each column identifies an incoming transaction identifier with conflicts and each row identifies the pending transaction that matched with the current or incoming transaction. For an incoming transaction to be able to complete, all the rows in its column should indicate non-pending transactions, or essentially all the rows in its column should be cleared.

FIG. 4 depicts an example of such a bit map array 40. In this example, the memory controller can support 8 transactions, and thus n=8, and there is one bus in the system, and thus x=1, which yields an 8×8 matrix. The transactions are labeled 0 to 7 and they have been received in that order. The columns 41 along the x axis indicate the incoming transactions. The rows 42 on the y axis indicate the conflicts (as shown by logical 1's) each of the incoming transactions have with pending transactions. In this example, transactions 0, 1, 2, 3, and 6 all reference memory location 0XA000, while transactions 4, 5, and 7 all reference location 0XB000. Since transaction 0 is the first transaction to reference this location, no conflicts exist (as would be indicated by logical 0's which are not shown for purposes of simplicity). Since transaction 1 arrived next, it conflicts with pending transactio 0. Transactions 2 and 3 are the next to arrive and this conflict with transactions 0, 1 and 0, 1, 2, respectively. Since transaction 6 is the fourth transaction to arrive referencing location 0XA000, it conflicts with transactions 0, 1, 2, 3. Transaction 4 references location 0XB000, and thus has no conflicts with transactions 0, 1, 2, 3. Transactions 5 and 7 are the next to arrive that reference location 0XB000, and thus conflict with transaction 4 and 4, 5 respectively. Note that the columns and rows may be switched, such that the rows indicate the incoming transactions and the columns indicate the conflicts. Further note that two values for x, n, and memory locations are by way of example only and other values could be used.

As the transactions complete, conflicts would be resolved. The state machine clears the bit map to reflect the resolutions. For example, when transaction 0 completes, the state machine will update the bit map to remove the 1's from columns 1, 2, 3, and 6. Since transaction 1 has no remaining conflicts, then transaction 1 may be processed to completion. Note that the operation of clearing is very simple since an entire row will be cleared as a transaction is completed. Since the bitmap is implemented in hardware, it is essential to keep if such operations as cleaning simple and efficient to be able to operate at high frequency with lesser number of gates to implement the structure. Also the bitmap is an orderly structure, which is easy to place and route in an ASIC.

In a multi-bus system, it will accordingly be n x . . . , i.e. in a multi-bus system with two buses, it will be a 2n·2n, and where there are three buses, it would be 3n·3n, such that each additional n in the column indicates pending transactions on the different buses involved.

Another way to look at this is in a multi-bus system, there are n unique transactions per bus. Hence, with 3 busses, there are 3 n unique transactions.

Figure 5:
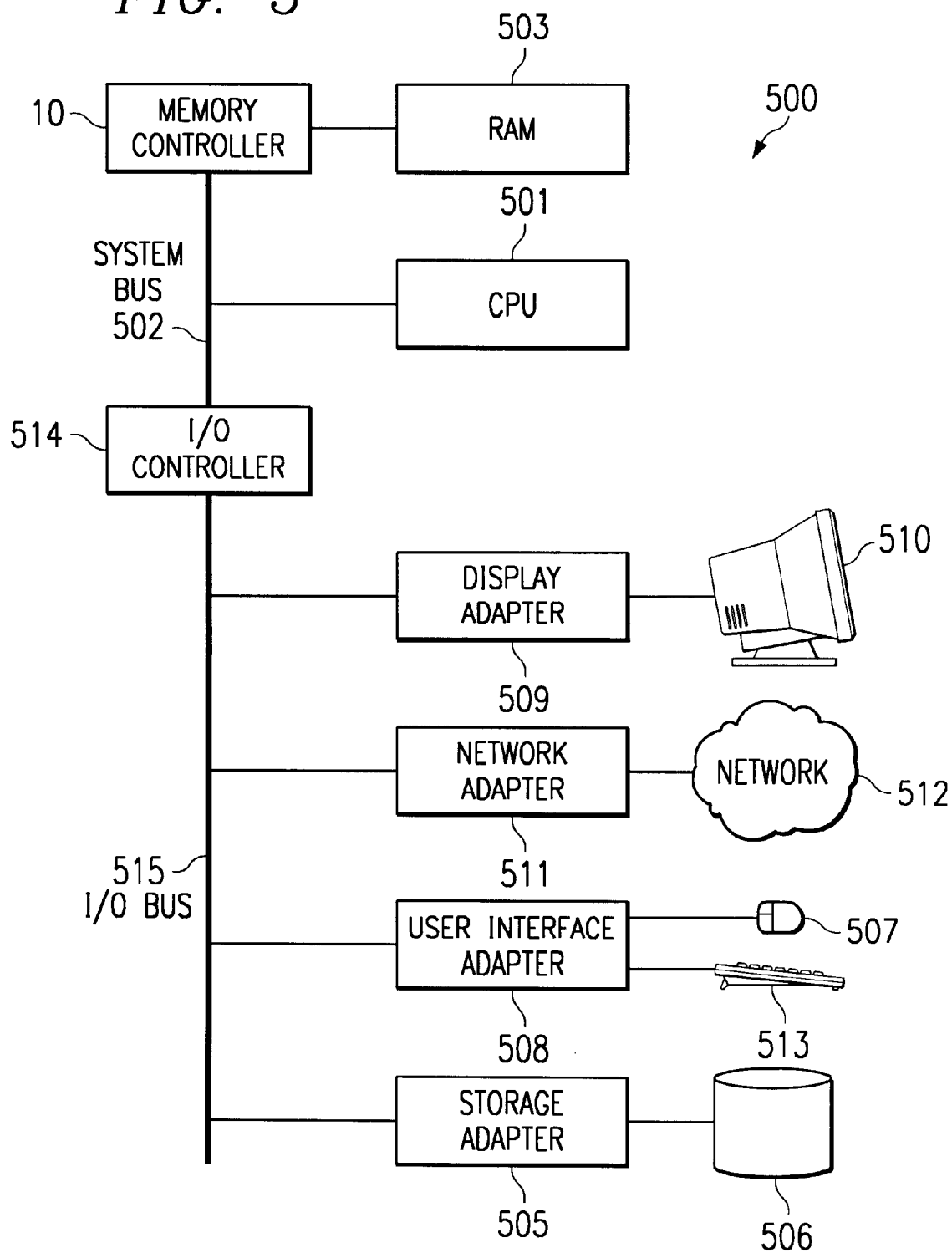
FIG. 5 depicts a high level block diagram of a computer system adapted to implement the inventive memory controller of FIG. 1.

FIG. 5 illustrates computer system 500 adapted to use the present invention. Central processing unit (CPU) 501 is coupled to system bus 502. Note that only one system bus and one processor are shown for simplicity, although the system 500 may include more than one system bus and/or processor, as shown in FIG. 1. In addition, bus 502 is coupled to random access memory (RAM) 503 through memory controller 10, and input/output (I/O) controller 514. The CPU 501 may be any general purpose CPU, such as an HP PA-8500. However, the present invention is not restricted by the architecture of CPU 501 as long as CPU 501 supports the inventive operations as described herein and that any bus is contemplated, but in a preferred embodiment, will be a Merced™ type bus utilizing the MESI protocol. Note, system 500 could include ROM (not shown) may be PROM, EPROM, or EEPROM. Also note, RAM 503 may be SRAM, DRAM, or SDRAM. RAM 503 and ROM hold user and system data and programs, as is well known in the art.

The I/O controller 514 connects various I/O devices to the system bus 502. The various I/O devices are connected to the controller 514 via I/O bus 515, for example computer display 510 via display adapter 509, network (such as a LAN, WAN, Ethernet, or Internet) 512 via network adapter 511, user devices such as pointing device 507 and/or keyboard 513 via user interface adapter 508, and mass storage (such as hard drive, CD drive, floppy disk drive, tape drive) via storage adapter 505.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A resource controller for managing transactions from a plurality of processors, wherein the resource controller is connected between a common resource and at least one bus, the plurality of processors are connected to the one bus, and each transaction originated from a particular processor of the plurality of processors and indicate a request by the particular processor to access the common resource, the resource controller comprising:

an array for storing a snapshot of conflict information describing conflicts between a particular transaction and at least one prior transaction from the one bus, wherein a conflict occurs when the particular transaction references a portion of the common resource that is referenced by at least one prior transaction;

a state machine for determining whether the particular transaction has any conflicts based on the information in the array; and wherein if the particular transaction has no conflicts, then the resource controller forms a response and returns the response to the originating processor, and if the particular transaction has at least one conflict then the resource controller delays forming the response until at least one conflict has been resolved.

2. The resource controller of claim 1, wherein:

the state machine updates the conflict information in the array to correspond to resolution of the at least one conflict.

3. The resource controller of claim 1, further comprising:

a queue for storing address information about each pending transaction;

wherein the address information defines a portion of the common resource that is associated with each pending transaction.

4. The resource controller of claim 3, wherein:

the state machine compares address information of the particular transaction with the address information in the queue to determine whether the address information of the particular transaction at least overlaps with the address information about the pending transactions.

5. The resource controller of claim 4, wherein:

the state machine creates the snapshot, if the state machine determines that the address information of the particular transaction and the pending transactions overlap.

6. The resource controller of claim 5, wherein:

the response is formed and returned to the originating processor, if the state machine determines that the address information of the particular transaction and the pending transactions do not overlap.

7. The resource controller of claim 3, wherein:

the state machine updating the address information in the queue to correspond to changes in status of the pending transactions.

8. The resource controller of claim 1, wherein:

the transactions are read transactions; and the common resource is memory.

9. A method for managing transactions from a plurality of processors via a resource controller, wherein each transaction originated from a particular processor of the plurality of processors and indicates a request by the particular processor to access a common resource, the method comprising the steps of:

storing a snapshot of conflict information describing conflicts between a particular transaction and at least one prior transaction in an array, wherein a conflict occurs when the particular transaction references a portion of the common resource that is referenced by at least one prior transaction;

determining whether the particular transaction has any conflicts based on the conflict information in the array;

forming a response to the request if the particular transaction has no conflicts;

delaying the step of forming, if the particular transaction has at least one conflict, until the at least one conflict has been resolved; and returning the response to the originating processor.

10. The method of claim 9, further comprising the step of:
   updating the conflict information in the array to correspond to resolution of the at least one conflict.

11. The method of claim 9, further comprising the step of:
   assigning an identifier to the particular transaction after receipt by the resource controller;
   wherein the step of assigning is performed prior to the step of storing conflict information.

12. The method of claim 9, further comprising the step of:
   storing address information about each pending transaction in a queue;
   wherein the address information defines a portion of the common resource that is associated with each pending transaction, and the step of storing address information is performed prior to the step of storing conflict information.

13. The method of claim 12, further comprising the step of:
   comparing address information of the particular transaction with the address information in the queue to determine whether the address information of the particular transaction at least overlaps with the address information about the pending transactions.

14. The method of claim 13, further comprising the step of:
   creating, if the steps of comparing determines that the address information of the particular transaction and the pending transactions overlap, the snapshot.

15. The method of claim 13, further comprising the step of:
   performing, if the step of comparing determines that the address information of the particular transaction and the pending transactions do not overlap, the steps of forming the response and returning the response.

16. The method of claim 12, further comprising the step of:
   updating the address information in the queue to correspond to changes in status of the pending transactions.

17. The method of claim 9, wherein:
   the transactions are read transactions; and
   the common resource is memory.

18. A computer program product having a computer readable medium having computer program logic recorded thereon for managing transactions from a plurality of processors, wherein each transaction originated from a particular processor of the plurality of processors and indicates a request by the particular processor to access a common resource, the computer program product comprising:

code for storing a snapshot of conflict information describing conflicts between a particular transaction and at least one prior transaction in an array, wherein a conflict occurs when the particular transaction references a portion of the common resource that is referenced by at least one prior transaction;

code for determining whether the particular transaction has any conflicts based on the conflict information in the array;

code for forming a response to the request if the particular transaction has no conflicts;

code for delaying the step of forming, if the particular transaction has at least one conflict, until the at least one conflict has been resolved; and code for returning the response to the originating processor.

19. The computer program product of claim 18, further comprising:
   code for updating the conflict information in the array to correspond to resolution of the at least one conflict.

20. The computer program product of claim 18, further comprising:
   code for assigning an identifier to the particular transaction after receipt by the resource controller;
   wherein the code for assigning is operable prior to the code for storing conflict information.

21. The computer program product of claim 18, further comprising:
   code for storing address information about each pending transaction in a queue;
   wherein the address information defines a portion of the common resource that is associated with each pending transaction, and the code for storing address information is operable prior to the code for storing conflict information.

22. The computer program product of claim 21, further comprising:
   code for comparing address information of the particular transaction with the address information in the queue to determine whether the address information of the particular transaction at least overlaps with the address information about the pending transactions.

23. The computer program product of claim 22, further comprising:
   code for creating the snapshot, which is operable if the code for comparing determines that the address information of the particular transaction and the pending transactions overlap.

24. The computer program product of claim 22, further comprising:
   code for performing the code for forming the response and the code for returning the response, which is operable if the code for comparing determines that the address information of the particular transaction and the pending transactions do not overlap.

25. The computer program product of claim 21, further comprising:
   code for updating the address information in the queue to correspond to changes in status of the pending transactions.

26. The computer program product of claim 18, wherein:
   the transactions are read transactions; and
   the common resource is memory.

* * * * *